March 5, 1957　　P. J. BRANCHU ET AL　　2,783,524
MACHINE FOR MAKING KNOTS
Filed March 1, 1954　　6 Sheets-Sheet 3

United States Patent Office 2,783,524
Patented Mar. 5, 1957

---

2,783,524

MACHINE FOR MAKING KNOTS

Paul Joseph Branchu, Paris, and Albert Edmond Caudmont, Colombes, France, assignors of twenty-five percent to Pierre Pinardel and twenty-five percent to Jacques Patrice de Willenich, Paris, France Application March 1, 1954, Serial No. 413,252

Claims priority, application France February 27, 1953

16 Claims. (Cl. 28—1)

The object of the present invention is a machine for the making of knots. The invention is particularly, but not exclusively, adapted for knots on chenilles used for the manufacture of imitation astrakhan fur.

Methods for the manufacture of imitation astrakhan are known which utilize "chenilles" of a textile material (rayon for instance), constituted by an axial yarn having bushy piles, radially extending therefrom. It is also known that, to obtain a better imitation of the genuine astrakhan, it is necessary to create a periodical discontinuity in the chenille by means of knots, this chenille being subsequently applied to a supporting surface. The making of these knots which, up to now, are hand made, requires skilled personnel and is difficult to carry out mechanically, specially when the chenille is long, since to make each knot requires passing the entire chenille length through the loop of the knot.

The method according to the invention, eliminates these drawbacks and consists in placing the chenille in accordance with an undulating line, in twisting the successive undulations upon themselves so as to cross the strands in each undulation, forming thereby loops arranged in succession in parallel planes and, to end, in driving in a single operation one of the free ends of the chenille through all these alined loops.

Another object of the invention is a machine for carrying out the above method. According to the invention said machine comprises, on one hand a series of hooks, hollowed out in the shape of gutters and mounted to swivel over at least 270°, and on the other hand, a series of rocking levers, alternating with these hooks and means to alternately drive the chenille behind the opposed faces of said hooks and said levers, the rocking of which will then place the chenille according to an undulating line.

By way of example, two embodiments of a machine according to the invention have been described hereafter and illustrated in the attached drawings.

The machine illustrated in the attached drawings comprises a frame 1 made of shaped steel, in the shape of angle irons, for instance. Upon a horizontal portion of the frame is provided a roller track 2, in the shape of an U, the legs of which have grooves 2a, 2b for the guiding of the rollers 3 and 4 of a movable carriage 5.

Upon this carriage are mounted: on the one hand, the bobbin 6 from which winds off the chenille, on the other hand a pulley 7 or a similar element equipped with means for braking the unwinding of the chenille, and a roller 8 mounted on an horizontal shaft acting when the carriage is moved, as a cam for actuating fingers 9, the working of which shall be described hereafter.

Figures 1, 3:
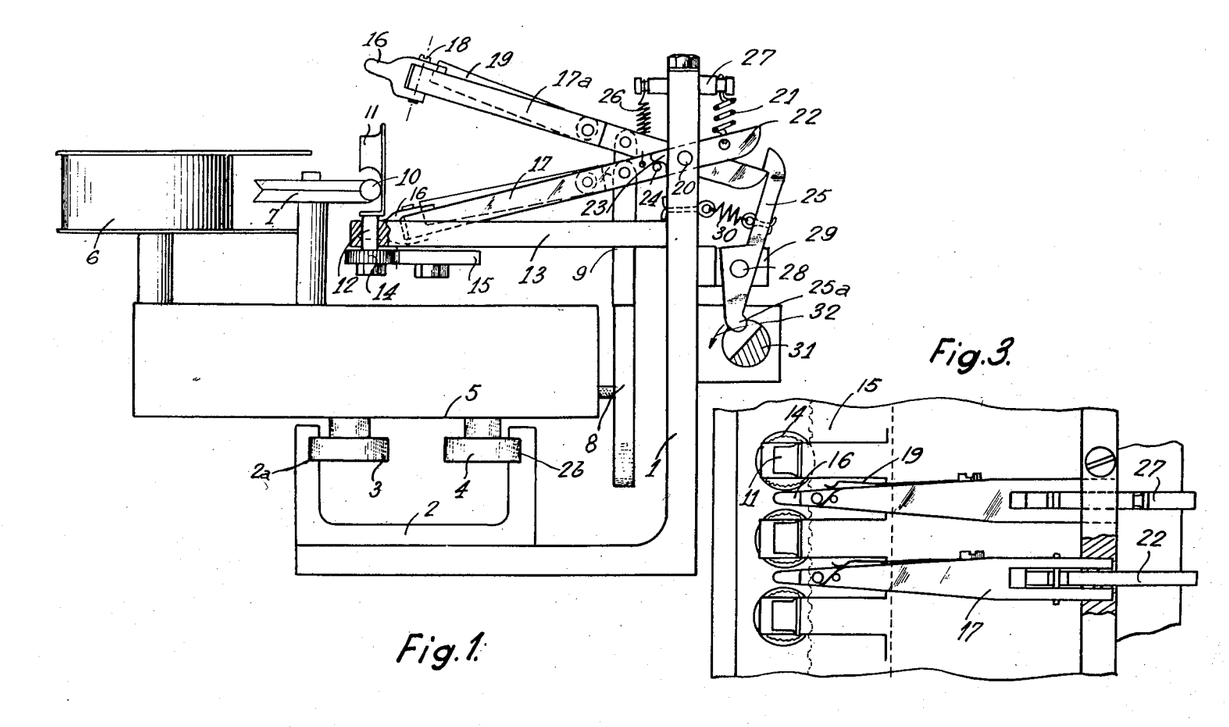
Fig. 1 is a front view of a machine according to the invention.
Fig. 3 is a partial plan view of the same machine.
Figure 2A:
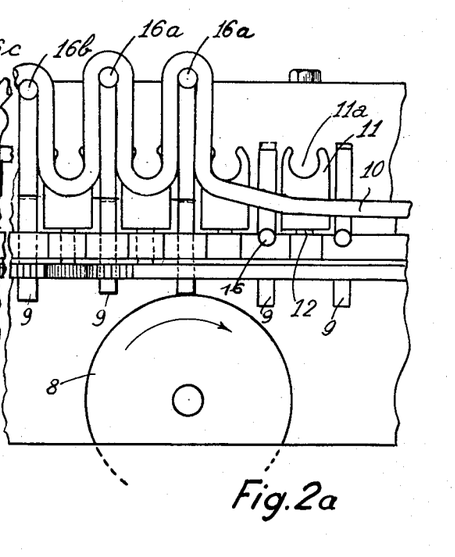
Figs. 2a and 2b are partial elevation views of the machine in Fig. 1 and show the operation thereof.

The carriage 5 being at the left end of the machine (Figure 2), one of the ends of the chenille is fixed to any suitable place of the frame 1, for instance. The chenille 10 (seen in cross section in Fig. 1) is placed under a series of hooks 11 (Figs. 1, 2a and 2b), having recesses 11a, individually mounted on axles 12 trunnioned on bench 13 integral with the frame 1. The lower ends of the axles 12 bear toothed wheels or pinions 14 meshing with a rack 15 positioned movably under the bench 13 and sufficiently movable lengthwise to allow for the toothed wheels 14 and the hooks 15 to rotate at least 270°.

In the first stage of the making of the knots, the chenille is placed above the free ends 16 of the hinged levers 17. The ends 16 are pivotally hinged on the levers 17 by means of pins 18 perpendicular to the direction of the levers 17. They are urged into position by plate-springs 19. The levers 17 are hinged upon the frame 1 along an axle or pivot 20 parallel to the direction of the frame. The push-fingers 9, capable of being lifted by the roller 8 of the carriage 5 when this carriage moves along the frame, are pivotally hinged on the levers 17, thus allowing these levers to be positioned in the upper position 17a (Fig. 1), the ends 16 being brought in the position 16a (Fig. 2a), against the opposition of the springs 21. These springs 21 are, in turn, fixed to small levers 22 hinged on the same axle or pivot 20 as the levers 17 upon which they bear by means of noses or extensions 23 and pins 24, integral with the levers 17. When a lever has been rocked into position 17a by a push of the roller 8 on the corresponding finger 9, it will be kept in this position by a locking hook 25 which overcomes the extension of the spring 21. The lever 17 stands in this position subject only to the pull of a small opposing spring 26 which urges and keeps it in the lifted position with a reduced strength.

The springs 21, 26 are hooked, at the other end, on arms or extensions 27 crossing perpendicularly the upper part of the frame 1.

The hook 25 is pivotally hinged at 28 on a stand 29 integral with the frame. A spring 30 urges the end of the hook 25 towards the frame. The opposite end 25a can be operated by a cam shaft formed by an axle or cam shaft 31, milled at intervals in the shape of a half moon opposite each of the hooks 25. A control hand grip for the cam shaft 31 allows, by rotating this shaft in the direction of the arrow 32, the end of the small levers 22 to be freed. Through the urging of the springs 21, the noses 23 will then bear upon the pins 24 and the levers 17a will return to their initial position in 17.

The above described machine works as follows:

In the starting position, the carriage 5 is, for instance, at the left end of the frame and the bobbin 6 is provided with a sufficient length of the chenille (about three times the length of the frame), the end of which is fixed to any suitable place of the bench 13 and all the levers are in the lowered position.

As the carriage 5 moves towards the right (either hand driven, motor driven or pulled by a cable), the chenille is first placed rectilinearly in the space between the recessed hooks 11 and the ends 16 of the levers 17. The chenille is slightly stretched, due to the distributing brake associated with the roller or pulley 7. When the roller 8 arrives level with a finger 9, the finger is pushed upwards and the corresponding lever 17 is brought into position 17a. In their rocking motion, the ends 16 carry along the portion of the chenille included between two consecutive recessed hooks 11. The ends 16 move to position 16a and the levers 17 are locked in the upper position 17a, as above explained. Thereby, when the carriage has passed, the chenille 10 shows a succession of non closed undulations, staggered in the same plane.

Figure 2B:
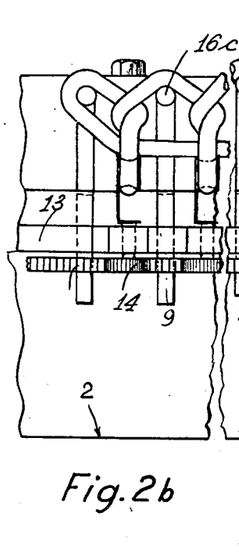

When the carriage has reached the end of its stroke, the rack 15 is manually or automatically operated to swivel the recessed hooks 11 substantially 270°, clockwise for instance (Fig. 2b), thus crossing the strands of each undulation and forming loops situated in parallel planes, perpendicular to the plane of the figure. These loops are formed around the hooks 11 which, after this rotation of 270° are alined in succession. During this swiveling of the hooks 11, the levers 17 come close to the hooks 11, as illustrated in Figure 2b, coming in succession to positions 16b and 16c.

The last step of the knot making operation consists in introducing in the recesses 11a (this is to say through the formed loops) a stem having at least the length of the frame. As this stem, at the left side of the machine, goes beyond the first hook 11, one ties at this end the corresponding end of the chenille which had previously been fixed to the bench of the machine. By simply removing the stem, the chenille will be dragged with it. As the chenille pulls upon the free end 16 of the first lever 17, this end 16 is swivelled towards the right against the resistance of the spring 19, the chenille escapes from the first lever 17 and the first knot is formed thereby. This first knot, the outer diameter of which is smaller than the diameter of the recess 11a passes in the second recessed hook 11 and the pull upon the chenille being continuous, the second knot is formed in the same way as the first.

Figure 4:
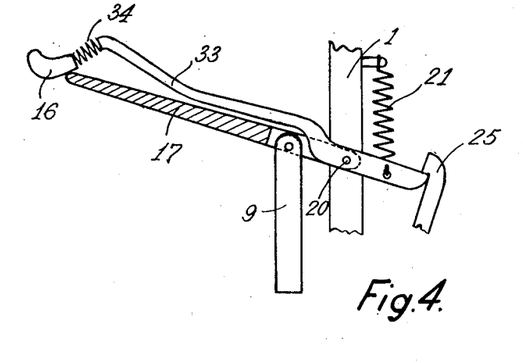
Figure 4 is a detailed view of a modified form of Figure 3.

In the Figure 4 a modification of the construction of the levers 17 and ends 16 has been illustrated. The lever 17 is still hinged at pivot 20 and bears, as previously, a push-finger 9, but the end 16 is mounted on the end of another lever 33, also hinged in 20 and extending towards the rear of the frame, so as to be locked by the hook 25. The rear end of the lever 33 is subjected to the action of the spring 21. The end 16 is connected with the lever 33 by means of a spring 34, thus allowing a much easier unhooking of the chenille from the end, when the knot is formed. On the other hand, the lever 17 extends forward enough to come in contact with the curved lower part of the end 16: this arrangement allows the lever 33 to be moved upwardly when the push-finger 9 is operated by the roller 8. In this modified form, when the roller 8 has passed the finger 9, the associated lever 17 falls down, the end 16 being sustained only by the elasticity of the spring 34.

In the Figures 5 to 21, is illustrated an embodiment of a machine according to the invention, in which all the operations above described are carried out automatically.

Figure 5:
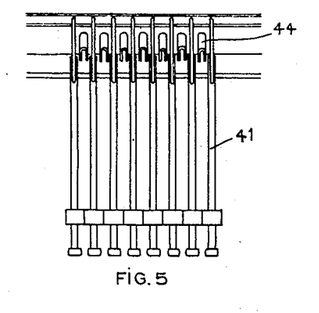
Figs. 5 to 7 illustrate diagrammatically essential parts of a second embodiment of the machine, in front elevation, in plan and in side elevation, respectively.
Figure 6:
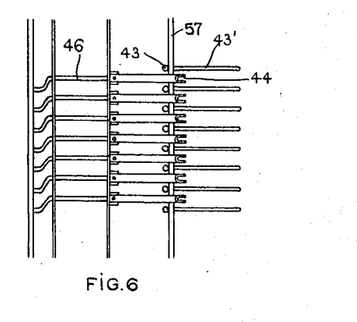
Figure 7:
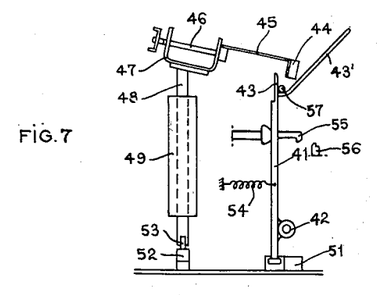
Figure 8:
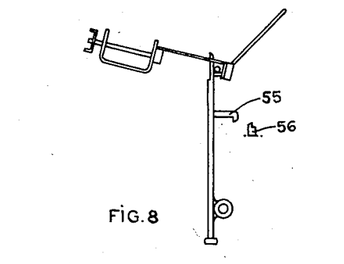
Figs. 8 to 13 are diagrammatic views showing the working principle of the second machine.

As shown in the Figures 5 to 8, the machine includes a series of levers 41, which, at rest, stand fairly vertically: these levers are hinged on horizontal axles 42 and end, at their upper part, in forks 43, 43', the vertical arm 43 of which is rather short. Between the levers 41, are mounted recessed hooks 44, having the shape of semi-tubular gutters opened towards the front, which at rest, slant slightly from the vertical (Figure 7). The hooks 44 are supported by stems 45, slanting slightly from the horizontal and fixed on axles 46 trunnioned in forks 47 fixed upon a frame 48 which can move upwardly in a slide or guide 49. A carriage 50 can move under the above described parts, said carriage bearing, on the one hand, an inclined plane 51 acting on the lower ends of the levers 41 to rock them around the axles 42 and, on the other hand, an inclined plane 52 to lift the frame 48 through the rollers 53. The levers 41 are provided, on the one hand, with return springs 54 to keep them at rest against stops 55 and on the other hand with a ratchet device 55—56 to lock them when in rocked position.

The machine works as follows:

As shown in Figures 5 to 7, the thread or chenille to be knotted 57 is placed in the bottom of the forks 43, 43'. The frame 48, supporting the recessed hooks 44, is then lowered so that all the hooks 44 will simultaneously engage their cylindrical non recessed face behinde the chenille 57. The motion of the inclined plane 51 of the carriage 50 causes the rocking of the levers 41 in succession, in the direction of the arrow (Figure 9), thus placing the chenille 57 in accordance with an undulating line (Fig. 10), between the hooks 44 and the arms 43 of the forks.

Figures 12, 13:
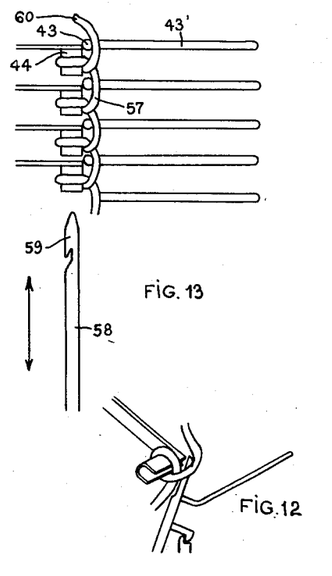
Figure 14:
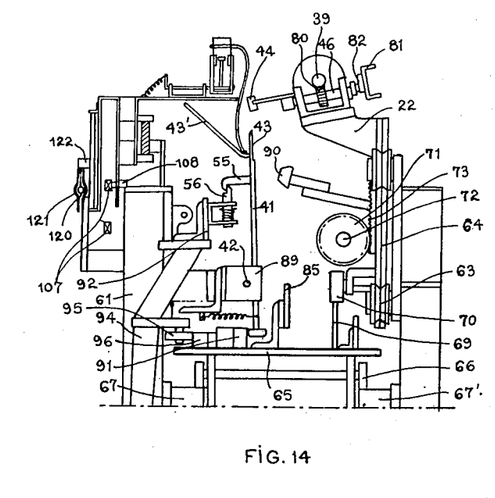
Fig. 14 is a front elevation view of the machine, the automatic device for showing in Figs. 5 to 13 the laying of the chenille having been omitted for sake of simplicity.
Figure 15:
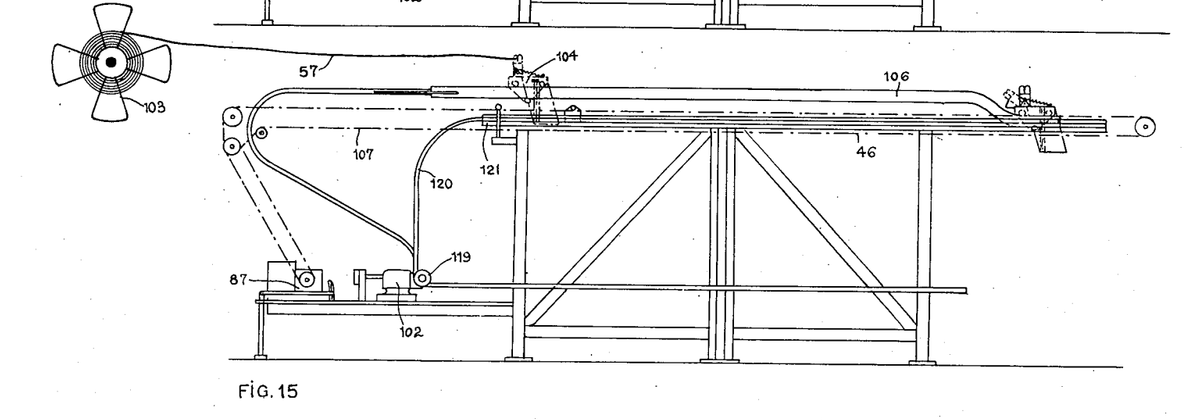
Fig. 15 is an elevation view of the automatic device for the laying of the chenille in the machine shown in Fig. 14.
Figure 16:
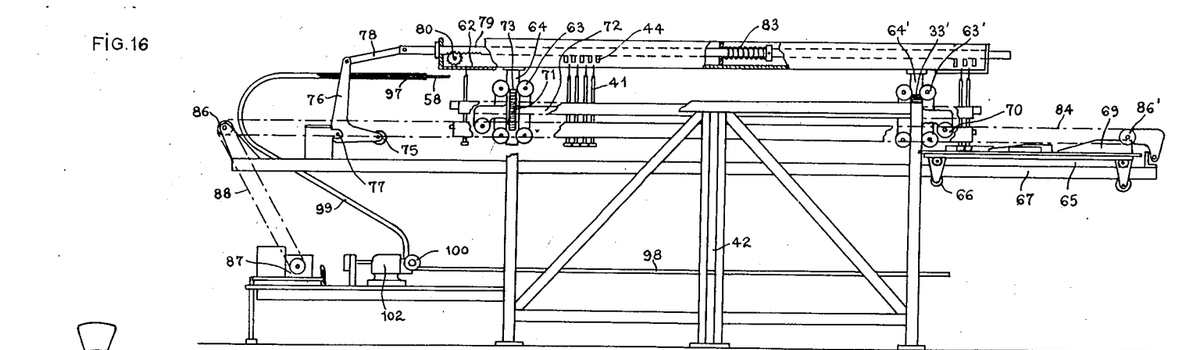
Fig. 16 illustrates a cross section of the same machine.
Figure 17:
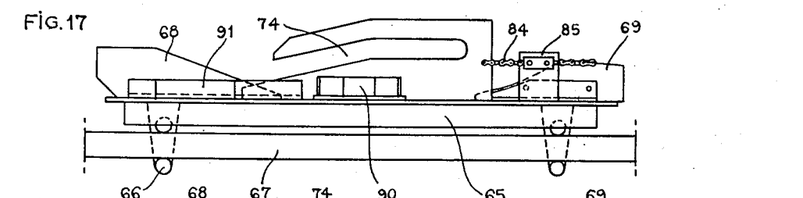
Figs. 17, 18 show, in elevation and in plan, respectively, the driving carriage of the machine in Fig. 14.
Figure 18:
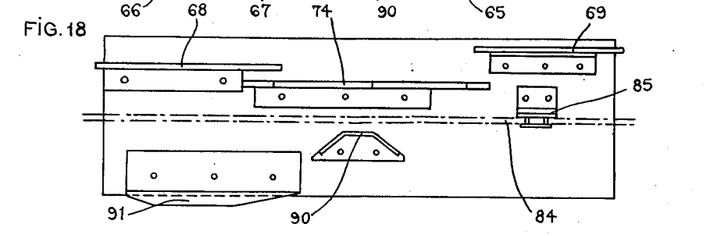
Figure 19:
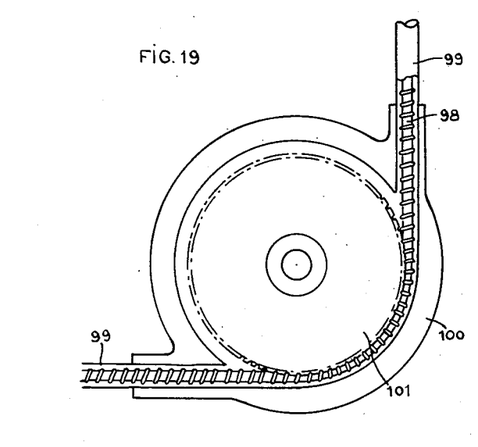
Fig. 19 illustrates in cross elevation the device controlling the needle in the same machine.

The levers 41 are first rocked beyond their locking positions on the fingers 56 by the latches 55, then are pulled back, by their springs 54 in the locking position (Figure 11), thus securing to the undulations of the chenille 57 the supplementary length necessary for the forthcoming formation of the loops. When the undulations are formed, all the recessed hooks 44 are rocked substantially 270° in the direction of the arrows (Figure 11), by operating their axles 46, through parts which are described later on, at in same time, the frame 48 supporting these rocking hooks 44 is lifted slightly. The result is the formation of loops crossed around the recessed hooks 44 and passing around the top of the arm 43 of the forks 43—43' of the levers 41; thus being prevented from falling out of said hooks (Figure 12). After this rocking of 270°, all the recessed hooks 44 are aligned along on horizontal line (Figure 13) so that a needle 58 can be passed through these hooks 44. A hook 59 at the end of the needle 58 engages the free end 60 of the chenille 57 and pulls it backwards through the recessed hooks 44 and the crossed loops carried by these hooks so that these loops will slip in succession from the hooks 44 and form, due to the pull exerted on the chenille 57 by the needle 58, knots which pass through the loops not yet knotted.

Referring now to Figures 14 to 18, it will be seen that the machine includes a fixed frame 61 upon which is mounted a frame 62 movable vertically and guided in this motion by two trains of four rollers 63, 63', each running on two vertical rails 64, 64'. This movable frame 62 supports the device 44—45—46—47 of the rocking hooks and is actuated by a carriage 65, running by means of rollers 66 on two longitudinal rails 67, 67', mounted on the frame 61. For this purpose, the frame 61 supports two inclined planes 68, 69 coming in contact with rollers 70 trunnioned at the ends of the movable frame 62. The lifting and lowering of this frame is operated by an end of these inclined planes and by these rollers to avoid any buckling or jamming of this frame 62, it is provided at both ends with pinions 71 mounted on a common longitudinal shaft 72 and meshing with racks 73, 73' provided for on the vertical guiding rails 64, 64'. The rocking of the recessed hooks 44 is also actuated by the carriage 65 when it reaches the left end of its stroke: the carriage is, therefore, equipped with an inclined plane 74, in the shape of a groove (Figure 17) which comes in contact with a roller 75 (Figure 16) mounted at the end of a crank lever 76 pivoted in 77 on the frame 61 and connected by a short rod 78 with a rack 79 guided on the frame 62 which supports the hooks 44. The rack 79 meshes with two pinions 80, respectively mounted on the shafts 46 of the two end hooks 44. All the shafts 46 are connected through cranks 82 with a connecting rod 81. The rack 79 is provided with a return spring 83 to return the recessed hooks to their initial position when the inclined plane 74 of the carriage 65 no longer actuates the roller 75, when the carriage moves anew towards the right.

The carriage 65 is driven along the machine by means of a chain 84 with which it is connected by a central part 85 (Fig. 14): the chain is mounted on two pinions 86, 86', trunnioned at either end of the frame, the pinion 86 being driven by the motor 87 through a chain connection 88. Switches (not shown) actuated by the carriage 65 stop the motor and control the working of an electro-magnetic brake when the carriage 65 reaches the end of its right or left stroke.

The rocking levers 41 (Figures 14 and 16) are mounted on a same axle 42, mounted in supports 89 stationary on the fixed frame 61 and, at rest, are urged by the return springs 54 against a longitudinal abutting rod 90, preferably coated with rubber. These levers are rocked towards the left by an inclined plane 91 (Fig. 18) of the carriage 65, when this carriage moves from right to left. As already explained, these levers, when rocked, engage through their latches 55 the spring fingers 56 fixed on a holder 92 mounted on a longitudinal axle 93 and equipped at its right end with a lever 94 carrying a roller 95 which is actuated by the inclined plane 96 of the carriage 65 when this carriage reaches the end of its stroke towards the right. The holder 92 of the latches 56 rocks then towards the right, disengaging the pawls or latches 55 so that the levers 41 can be brought back to their initial position against the abutment 90 by the return springs 54.

The needle 58, the working of which has been described above, is guided at the start, by a horizontal metallic tube 97 (Fig. 16), placed on a level with the recessed hooks 44. The needle is actuated by means of a flexible cable 98 (Figure 19), constituted by a strand of a flexible material around which is helically wound a wire. The cable is guided in a sheath 99 and is inserted (Figures 14 and 19) in a casing 100 in which is mounted a toothed wheel 101 driven by the motor 102 and meshing with the cable 99 acting as a flexible rack.

The setting and the working of the chenille in the machine are carried out by means of the following parts: The chenille 57 wound upon a rotating bobbin 103 (Figure 15) is slightly unwound and its end is fixed to a second carriage 104 (Figs. 15, 20, 21) running by means of three rollers 105, 105', 105'' upon a raised rail 106 so as to move above the forks 43, 43' of the rocking levers 41 (Figure 16), said rail slanting downwards at the right end of the machine. The carriage 104 is driven by a second chain 107 actuated simultaneously with the chain 84 of the main carriage by the motor 87 and the chain connection 88. Nevertheless this chain is not fixed to the carriage 104 and drives it forward by means of a trigger 108 (Fig. 21) fixed to one of its links, so that the chain can be driven alone backwards, leaving the thread carrying carriage 104 at the end of the stroke to the right of the machine. To secure the fixing of the chenille 57, the carriage 104 is provided with a double clip (Figs. 20, 21) comprising two steel wires 110, 110', the upper ends of which are bent in a U shape. This clip is provided with an axle or shaft 111 trunnioned on the carriage and upon which is fixed an arm 112, the other end of which is connected with the carriage by a spring 113 so that the clip can take two balancing positions, a vertical and a horizontal position. An intermediate balancing position can also be established (illustrated in solid line in Figure 20) by bringing to abut on a crank plate spring 114 the end of a spring rod 115 fixed inside the clip 110—110'. This device works as follows: the carriage 104, with the chenille transversally hooked in the clip 110, 110' in the vertical position is moved from the left to the right at same time as the main carriage 65. At the end of the stroke towards the right, the carriage 65 lifts the frame 62, which carries the recessed hooks 44, by the action of the inclined plate 68 on the roller 70 and brings back the rocking levers 41 at rest by the action of the inclined plane 91 (position of Figure 7) thus allowing the chenille 57, carried by the carriage 104, to come inside the forks 43—43' of the levers 41. The carriage 104, when arriving to the right abuts against a stop 125 (Figure 20) which tilts the clip 110—110' in the position shown in solid line in Fig. 20.

Figure 9:
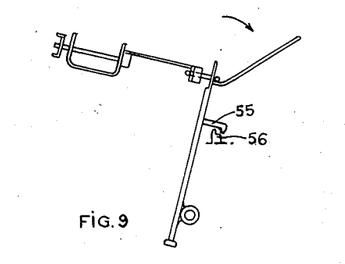
Figure 10:
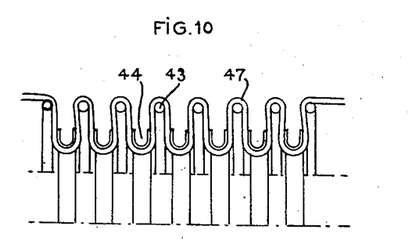
Figure 11:
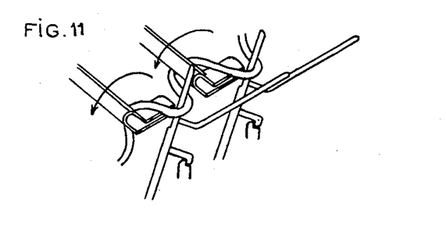

At that moment, the motor 87 is actuated to drive back the carriage 65, thus effecting, first, through the inclined plane 68, the lowering of the frame 62 supporting the hooks 44 (position of Figure 8) and after, through the inclined plane 90, rocking in succession the levers 41 forming thereby the undulations of the chenille 57 (Figs. 9 and 10). During this period, the carriage 104 remains at the end of the right stroke, since the chain 107 can only drive the carriage to the right through the trigger 108, but cannot drive it back. When at the stroke end, to the left, the carriage 68 effects, through the inclined plane 74, the rocking and lifting of the hooks 44 and thereby the formation of the crossed loops (Figs. 12 and 13).

At that moment, through the motor 102, the needle 58 is pushed towards the right, passing through the aligned recessed hooks. When arriving to the stroke end to the right, the needle 58 pushes back the resilient abutment stem 115, thus allowing the spring 113 to return the clip 110—110' to a substantially horizontal balancing position, so that, upon the back motion of the needle, the hook of the needle clings to the end of the chenille fixed across the clip 110—110', removes it from the clip and drives it anew through all the recessed hooks forming the knots, as above explained.

Figures 20, 21:
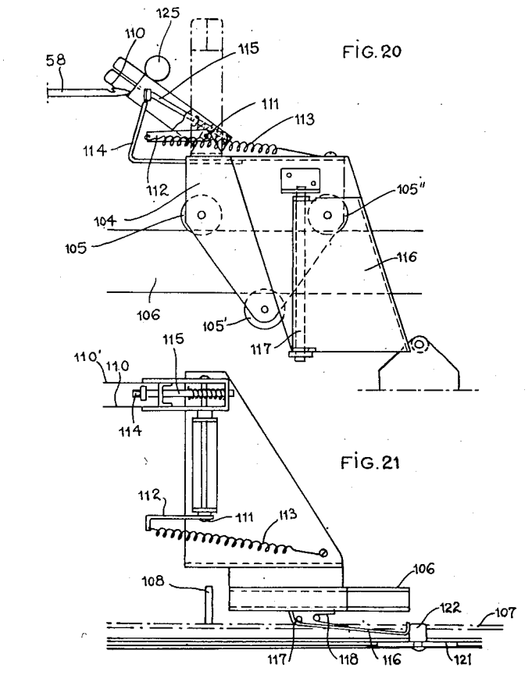
Figs. 20, 21 illustrate in elevation and in plan the carriage to lay out the chenilles in the same machine.

One has just to cut the length of the chenille provided with knots and to start the process anew, however, the carriage 104 must first be driven back to the left: this motion is carried out by means of the following elements; the carriage 104 bears, upon the side, a paddle 116 pivotally hinged on a vertical axis 117 and kept slightly apart from the carriage by a clip-shaped spring 118 (Fig. 21). On the same axis as the control casing 100 for the cable 99 of the needle 58, is mounted a second casing 119 (Fig. 115), controlling a cable 120 guided along the frame of the machine (Fig. 15) by a tube 121 slit along its upper portion to allow the free passage of a crank trigger 122 fixed (Fig. 21) at the end of the cable 120. When the trigger 122 comes in contact with the carriage 104, stopped at the end of the right stroke, it rocks the paddle 116 around the axis 117 and moves farther: as the spring 118 again thrusts the paddle 116 aside, the trigger 122 is ratched by this paddle 116 and can drive the carriage 104 towards the left when the return motion of the cable 120 is actuated by the motor 102.

It can readily be seen that all the operations can be controlled by a single operator standing at the left end of the machine.

What we claim is:

1. Machine for the making of knots on threads, cords and the like, particularly on the chenilles intended for the manufacture of imitation astrakhan, comprising a series of hooks, recessed in the shape of gutters, arranged when at rest, in parallel directions, axles parallel to each other and perpendicular to the hooks which are fixed on said axles, means to swivel these axles of at least 270° to bring said gutters in alignment with one another, a series of levers parallel to each other alternating with said recessed hooks and adapted to rock around axles perpendicular to the axles of the recessed hooks, means to engage the chenille behind the opposed faces of the hooks and the levers, so as to place, through the rocking of said levers, the chenille in accordance with an undulating line, a movable stem, means to fix the free end of the chenille on this stem and means to pass this stem through the recessed hooks alined after their rocking of 270°.

2. Machine for the making of knots on threads, cords and the like, particularly on the chenilles intended for the manufacture of imitation astrakhan, comprising a fixed frame, a series of parallel axles trunnioned on said frame, a series of hooks recessed in the shape of gutters, disposed, when at rest, in parallel directions and fixed to the ends of said axles, respectively, means to swivel said axles of at least 270°, a series of levers, disposed in parallel directions alternating with said recessed hooks and adapted to rock round axles perpendicular to the axles of the hooks, means to engage successively the chenille in front of said levers and behind said hooks, the chenille being thereby, at the rocking of said levers, placed in accordance with an undulating line, a carriage movable along the fixed frame of the machine and comprising means to rock successively said levers, a movable stem, means to fix the free end of the chenille on this stem and means to pass this stem through the recessed hooks alined after their rocking of 270°.

3. Machine for the making of knots on threads, cords and the like, particularly on the chenilles intended for the manufacture of imitation astrakhan, comprising a fixed frame, a series of parallel axles trunnioned on said frame, a series of hooks recessed in the shape of gutters, disposed, when at rest, in parallel directions and fixed to the ends of said axles, respectively, means to swivel said axles of at least 270°, said means comprising pinions mounted on the axles of the hooks and a rack movable along the frame of the machine and in mesh with said pinions, a series of levers, disposed in parallel directions alternating with said recessed hooks and adapted to rock round axles perpendicular to the axles of the hooks, means to engage successively the chenille in front of said levers and behind said hooks, the chenille being thereby, at the rocking of said levers, placed in accordance with an undulating line, a carriage movable along the fixed frame of the machine and comprising means to rock successively said levers, a movable stem, means to fix the free end of the chenille on this stem and means to pass this stem through the recessed hooks alined after their rocking of 270°.

4. Machine for the making of knots on threads, cords and the like, particularly on the chenilles intended for the manufacture of imitation astrakhan, comprising a fixed frame, a series of parallel axles trunnioned on said frame, a series of hooks recessed in the shape of gutters, disposed, when at rest, in parallel directions and fixed to the ends of said axles, respectively, means to swivel said axles of at least 270°, said means comprising pinions mounted on the axles of the hooks and a rack movable along the frame of the machine and in mesh with said pinions, a series of levers, disposed in parallel directions alternating with said recessed hooks and adapted to rock round axles perpendicular to the axles of the hooks, means to engage successively the chenille in front of said levers and behind said hooks, the chenille being thereby at the rocking of said levers, placed in accordance with an undulating line, a carriage movable along the fixed frame of the machine and comprising means to rock successively said levers, means also mounted on said carriage to actuate, at the end of its stroke, the rack controlling the swivelling of the recessed hooks, a movable stem, means to fix the free end of the chenille on this stem and means to pass this stem through the recessed hooks alined after their rocking of 270°.

5. Machine for the making of knots on threads, cords and the like, particularly on the chenilles intended for the manufacture of imitation astrakhan, comprising a series of hooks, recessed in the shape of gutters, arranged, when at rest, in parallel directions, axles parallel to each other and perpendicular to the hooks which are fixed on said axles, means to swivel these axles of at least 270°, a series of levers parallel to each other alternating with said recessed hooks and adapted to rock around axles perpendicular to the axles of the recessed hooks, means to engage the chenille behind the opposed faces of the hooks and the levers, so as to place, through the rocking of said levers, the chenille in accordance with an undulating line, a return spring provided on each of these levers, a locking device adapted to fix the levers in the rocked position and means to release the locking device and to allow the levers actuated by the return springs, to return to their resting position, a movable stem, means to fix the free end of the chenille on this stem and means to pass this stem through the recessed hooks alined after their rocking of 270°.

6. Machine for the making of knots on threads, cords and the like, particularly on the chenilles used for the manufacture of imitation astrakhan comprising a fixed frame, on this fixed frame a movable frame adapted to move vertically, a series of parallel equidistant shafts, slightly slanting and disposed in planes transverse to the movable frame on which they are trunnioned, hooks recessed in the shape of gutters fixed on the free ends of said shafts and being, at rest, in a fairly vertical position, a series of levers alternating with said recessed hooks and mounted so as to rock individually round horizontal axles alined perpendicularly to the shafts of said hooks, these levers being provided at their upper ends with a fork, means to dispose on these forks the chenille to be knotted, means to lower down the movable frame so as to engage the recessed hooks behind the chenille, means to rock the levers and to lock them in the rocked position, means to swivel of 270° the recessed hooks and to lift simultaneously the movable frame supporting said hooks up to the level of the end of the arms of the forks by means of which the chenille is stretched on the rocking of the levers, a movable stem, means to fix the free end of the chenille on this stem and means to pass this stem through the recessed hooks alined after their rocking of 270°.

7. Machine according to claim 6 in which the fixed frame comprises at its ends two vertical rails, the forefaces of which are equipped with racks, whilst the vertically movable frame is provided, on the one hand, with two trains of four rollers adapted to run on the side edges of said vertical rails and, on the other hand, with a revolving longitudinal shaft provided at its ends with two pinions, respectively meshing with the racks of the vertical rails.

8. Machine according to claim 6 comprising two pinions respectively mounted on the shafts of the two endhooks, an horizontal rack meshing with said pinions, slidably mounted on the movable frame, cranks mounted on the ends opposed to the hooks of the shafts trunnioned in the movable frame, a longitudinal connecting-rod on which all these cranks are hinged and means to move said rack to control the swivelling of the recessed hooks.

9. Machine for the making of knots on threads, cords and the like, particularly on the chenilles used for the manufacture of imitation astrakhan comprising a fixed frame, at the ends of this fixed frame two vertical rails provided with racks on their fore-faces, a vertically movable frame equipped, on the one hand, at its ends with two trains of four rollers adapted to run on the side edges of said vertical rails and, on the other hand, with a revolving longitudinal shaft provided at its ends with two pinions respectively meshing with the racks of the vertical rails of the fixed frame, a series of parallel equidistant shafts, slightly slanting and disposed in planes transverse to the movable frame in which said shafts are trunnioned, hooks, recessed in the shape of gutters, fixed to the free ends of said shafts and being, at rest, in a fairly vertical position, two pinions respectively mounted on the shafts of the two end-hooks, an horizontal rack in mesh with said pinions, slidably mounted in the movable frame, cranks mounted at the ends opposed to the hooks of said shafts, a longitudinal connecting rod on which all these cranks are hinged, on the fixed frame a series of levers alternating with the recessed hooks of the movable frame and mounted so as to rock individually round axles horizontal and alined perpendicularly to the shafts of the hooks, said levers being provided at their upper ends with a fork and, under said fork, with a locking device for the rocked position and with a return spring fixed at one end to the lever, at the other end to the fixed frame, means to dispose the chenille to be knotted on these forks, two longitudinal rails fixed on the fixed frame above the recessed swivelling hooks and the rocking levers, a carriage provided with rollers adapted to run on said rails, on this carriage an inclined plane cooperating with the movable frame to lower said frame at the starting of its travel so as to engage the hooks behind the chenille placed on the forks of the rocking levers, a second inclined plane cooperating with said rocking levers to rock them in succession so as to dispose the chenille in accordance with an undulating line, control devices placed on this carriage and cooperating with the movable frame to actuate, at the end of the travel, the rack controlling a swivelling of 270° for the recessed hooks and a third inclined plane to lift simultaneously the movable frame so as to bring the hooks on a level with the end of the arms in the forks of the rocking levers upon which are stretched the undulations of the chenille, a movable stem, means to fix the free end of the chenille on this stem and means to pass this stem through the recessed hooks alined after their rocking of 270°.

10. Machine according to claim 9 in which the means to actuate the rack controlling the swivelling of the recessed hooks comprises a cranked lever, pivoted on the fixed frame, at one end of said frame, a small connecting-rod hinged, at one end, on an end of this cranked lever and, at the other end, on the end of the rack guided in the movable frame, a roller mounted at the other end of the cranked lever, a vertical plate fixed on the movable carriage and provided with a slanting groove to be engaged by said roller at the end of the stroke of the carriage.

11. Machine according to claim 9, comprising two toothed wheels set on the fixed frame, at its two ends, an electric motor to control the rotation of one of said wheels, an endless chain mounted on said wheels and to which is fixed the movable control carriage, switches disposed at the ends of the frame to control the circuit of the motor, means securing the working of these switches by the movable carriage at both ends of its stroke.

12. Machine according to claim 9, comprising a support on which are mounted the locking devices for the rocking levers, this support being pivoted on a longitudinal axle and being provided at one end with a lever, a spring fixed at one end to said lever and at the other end to the fixed frame, and a roller pivoted on the lever, whilst the control carriage is equipped with a cam cooperating with said roller at the end of the outward stroke to rock said support and release the rocking levers.

13. Machine according to claim 9, comprising above the forks of the rocking levers a fixed rail supported by the fixed frame, a second carriage equipped with rollers running on said rail, on this carriage a resilient clip intended to receive the end of the chenille to be knotted, a second endless chain simultaneously controlled with the chain of the main control carriage, a trigger mounted on said chain and cooperating with the carriage carrying the chenille to thrust it during its outward stroke only, means to release from said resilient clip the end of the chenille with a stem passing through the recessed hooks alined after their rocking of 270°, said stem being provided with a hook at its end for this use.

14. Machine according to claim 13, in which the resilient clip of the carriage carrying the chenille is constituted by a piece pivoted on said carriage round a transverse axle and by two clips, made of steel wire, arranged side by side on said piece, between which the end of the chenille is transversely clamped, a two position spring disposed to keep this hinged clip in vertical position and in a fairly horizontal position, a stop fixed on the frame to rock this clip at the end of the stroke of the carriage, an abutment device mounted in the carriage to keep this clip in an inclined intermediate position and adapted to be thrusted aside by the hook of the stem after said stem has crossed the recessed hooks and to engage the chenille on said hook of the stem.

15. Machine according to claim 9, comprising for the control of the movable stem passing through the recessed hooks a motor, a toothed wheel keyed on the shaft of said motor, a flat circular casing containing this wheel, two pipes tangentially connected with said casing, a flexible cable with an helical metallic coating guided in said pipes and crossing through the casing in which it engages said toothed wheel, one of the pipes having an horizontal part at the level of the recessed hooks in which, at the start, the movable stem is guided, the rear end of said stem being fixed to said cable.

16. Machine according to claim 13 comprising for the control of the backwards motion of the carriage carrying the chenille a motor, a toothed wheel keyed on the shaft of said motor, a flat circular casing containing this wheel, two pipes tangentially connected with said casing, a flexible cable with an helical metallic coating guided in said pipes and crossing through the casing in which it engages said toothed wheel, one of the pipes having an horizontal part extending along the frame of the machine and comprising a longitudinal slit, a trigger fixed on said cable near its end and extending outwards through this slit, a springed ratchet device provided on the carriage carrying the chenille and which is engaged by the trigger when the cable is at run's end, a stop provided at the other end of the machine to release this ratchet device.

References Cited in the file of this patent
UNITED STATES PATENTS

| | | |
|---|---|---|
| 2,489,488 | Haack | Nov. 29, 1949 |
| 2,501,268 | Finkelsteinas | Mar. 21, 1950 |
| 2,523,690 | Finkelsteinas | Sept. 26, 1950 |
| 2,619,704 | Frontel | Dec. 2, 1952 |